United States Patent
Gauthier et al.

(10) Patent No.: US 7,509,585 B1
(45) Date of Patent: Mar. 24, 2009

(54) DYNAMIC PAGING CONTROL SYSTEM AND METHOD

(75) Inventors: Matthew Charles Gauthier, Kirkland, WA (US); Andrew Kwatinetz, Seattle, WA (US); Alberto Swett, Redmond, WA (US); Vamshidar Rawal, Bellevue, WA (US); Nadja Haldimann, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 725 days.

(21) Appl. No.: 10/428,712

(22) Filed: May 2, 2003

(51) Int. Cl.
*G06F 3/00* (2006.01)
*G06F 9/00* (2006.01)
*G06F 17/00* (2006.01)

(52) U.S. Cl. ............... 715/762; 715/763; 715/764; 715/738; 715/864; 715/865

(58) Field of Classification Search ............ 715/738, 715/760, 762, 763, 764, 864, 865, 866, 851
See application file for complete search history.

(56) References Cited

U.S. PATENT DOCUMENTS

| | | | |
|---|---|---|---|
| 5,463,725 A | 10/1995 | Henckel et al. | |
| 6,009,429 A * | 12/1999 | Greer et al. | 707/10 |
| 6,271,840 B1 * | 8/2001 | Finseth et al. | 715/513 |
| 6,300,947 B1 * | 10/2001 | Kanevsky | 715/866 |
| 6,313,851 B1 | 11/2001 | Matthews, III et al. | |
| 6,460,058 B2 | 10/2002 | Koppolu et al. | |
| 6,546,397 B1 * | 4/2003 | Rempell | 707/102 |
| 6,734,873 B1 * | 5/2004 | Herf et al. | 345/629 |
| 2003/0229624 A1 * | 12/2003 | Petrisor et al. | 707/3 |
| 2004/0054968 A1 * | 3/2004 | Savage | 715/513 |
| 2004/0068460 A1 * | 4/2004 | Feeley et al. | 705/37 |
| 2004/0142720 A1 * | 7/2004 | Smethers | 455/550.1 |
| 2005/0107985 A1 * | 5/2005 | Agrawal et al. | 702/186 |

OTHER PUBLICATIONS

Search results: <http://www.altavista.com> [retrieved Feb. 11, 2003], pp. 1-2.
Search results: <http://www.amazon.com> [retrieved Feb. 11, 2003], pp. 1-5.
Search results: <http://www.google.com> [retrieved Feb. 11, 2003], pp. 1-2.
Search results: <http://www.hotbot.com> [retrieved Feb. 11, 2003], pp. 1-2.
Search results: <http://www.lycos.com> [retrieved Feb. 11, 2003], pp. 1-2.
Search results: <http://www.yahoo.com> [retrieved Feb. 11, 2003], pp. 1-3.

* cited by examiner

*Primary Examiner*—Dennis-Doon Chow
*Assistant Examiner*—Anita D Chaudhuri
(74) *Attorney, Agent, or Firm*—Merchant & Gould

(57) ABSTRACT

The present invention is directed to a method, system, and computer-readable medium for providing a dynamic paging control that selects the type of paging control to be displayed for use with paged content. Paging controls are used to navigate the paged content. Paging parameters describing the number of pages to be represented by the paging control and a description of the paging control's display environment are used to select the paging control type. If the paging parameters specify a type of paging control to use, that paging control type is used. If no paging control type is specified, the dynamic paging control automatically determines a paging control type based on the paging parameters. The page and the paging control type is then presented for display.

19 Claims, 7 Drawing Sheets

DYNAMIC PAGING CONTROL SYSTEM AND METHOD

FIELD OF THE INVENTION

The present invention relates in general to online content displays and in particular to a system and method for automating the display of paging controls for content displayed on client devices.

BACKGROUND OF THE INVENTION

Networks are well known in the computer field. By definition, a network is a group of computers and associated devices that are connected by communications facilities or links. An internetwork, in turn, is the joining of multiple computer networks, both similar and dissimilar, by means of gateways or routers that facilitate data transfer and conversion from various networks. A well-known abbreviation for the term internetwork is "internet." As currently understood, the capitalized term "Internet" refers to the collection of networks and routers that use the Internet Protocol ("IP"), to communicate with one another. The Internet has recently seen explosive growth by virtue of its ability to link computers located throughout the world. As will be appreciated from the following description, the present invention could find use in many interactive environments; however, for purposes of discussion, the Internet is used as an exemplary interactive environment for implementing the present invention.

The Internet has quickly become a popular method of disseminating information due, in large part, to its ability to deliver information quickly and reliably. To retrieve content or other data over the Internet, a user typically uses communications or network browsing software. A common way of retrieving online content is using a network "browser" to access content at a uniform resource locator ("URL") address that indicates the location of the content on a server.

A browser usually represents retrieved online content as paged content, such as from HyperText Markup Language ("HTML") formatted pages (e.g., Web pages). In particular, when online content is retrieved as a result of a search request, a series of Web pages may be represented by page numbers. For example, a search engine request may turn up a thousand separate references with twenty references per Web page, thereby presenting fifty Web pages of search results. These fifty Web pages would usually include a paging control for navigating from one page to the next, and to specific pages (e.g., a "flat" paging control might display as "[1] 2 3 4 5 10 20 30 40 50").

One problem with previous paging controls has been that different types of paging controls are appropriate for different types of display environments (i.e., the devices and/or applications that display pages). For example, if there is a relatively small number of pages represented by a paging control (e.g., ten or less), then it may be beneficial to list all the page results in a flat paging control that lists every page. While a flat paging control will work in some instances, if screen display space (or display space within an application displaying a page on a screen) is limited, and there are a large number of pages, a flat paging control becomes less desirable. While alternate paging controls are available, they are usually only desirable if a large number of pages are to be represented by the paging control or if display space is extremely limited (e.g., on a hand-held device or similar device with a small display area).

Prior solutions that address the issue of limited space have usually provided a single type of paging control. For example, an edit box paging control that requests a specific page number without listing all the pages, regardless of whether there is enough room on a particular drive to use a flat paging control for the specific number of items to be displayed. Such a solution is obviously a compromise because users generally prefer to have user interfaces that are easy to navigate, if they are available. Compromise solutions to the problem of which paging control to choose for a particular application are undesirable.

Accordingly, a need exists for a method of automatically selecting a paging control type from a plurality of paging control types available for display on a device based on the number of items to be displayed and/or the nature of the display environment.

SUMMARY OF THE INVENTION

The present invention is directed to a method, system, and computer-readable medium for selecting the paging control type to be used when content (pages) are displayed, herein referred to as a "dynamic paging control". In accordance with the invention, the dynamic paging control obtains paging parameters that describe the pages available to be displayed and/or the paging environment. If the parameters specify a type of paging control to be used, the specified paging control type is used by the dynamic paging control when the pages are displayed. If no paging control type is specified, the dynamic paging control automatically determines the paging control type to be used based on the paging parameters (e.g., the number of pages available to be displayed, type of display device, display dimensions, etc.). The selection of a paging control type may take place at a client device, or, in an alternate aspect, on a server.

In accordance with other aspects of this invention, prior to selecting the paging control type to be used based on the paging parameters, the dynamic paging control determines the type of display environment and selects the type of paging control to be used if the display environment is of one or more particular types.

In accordance with further aspects of this invention, if the display environment is not of one or more particular types, the type of paging control is selected based on the number of pages available to be displayed.

In accordance with additional aspects of the present invention the types of paging controls include, but are not limited, to a flat paging control, an edit box paging control, a drop-down paging control, a list box paging control, and a spin paging control.

As can be seen from the summary above, the present invention provides a client or server based method for automatically selecting a paging control type that takes into consideration the number of pages available to be displayed and/or the nature of the display environment and a related computer-readable medium and system.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The detailed description which follows is represented largely in terms of processes and symbolic representations of operations by conventional computer components, including a processor, memory storage devices for the processor, connected display devices, and input devices, all of which are well known in the art. These processes and operations may utilize conventional computing components in a heterogeneous distributed computing environment, including remote file servers, computer servers and memory storage devices, such processes and operations also being known to those skilled in the art. Each of these conventional distributing computing components is accessible by the processor via a communications network.

The present invention is directed to providing efficient access to paged content, i.e., pages, in computing environments. As will be better understood from the following description, client devices obtain paged content from a remote device such as a Web server. A dynamic paging control formed in accordance with the present invention selects a type of paging control to be displayed along with the paged content. More specifically, the dynamic paging control automatically determines the type of paging control to be used, based on the total number of pages available to be displayed and/or the nature of the paging environment. Depending on implementation, the dynamic paging control determination may take place either at the Web server or at the client device.

Figure 1:
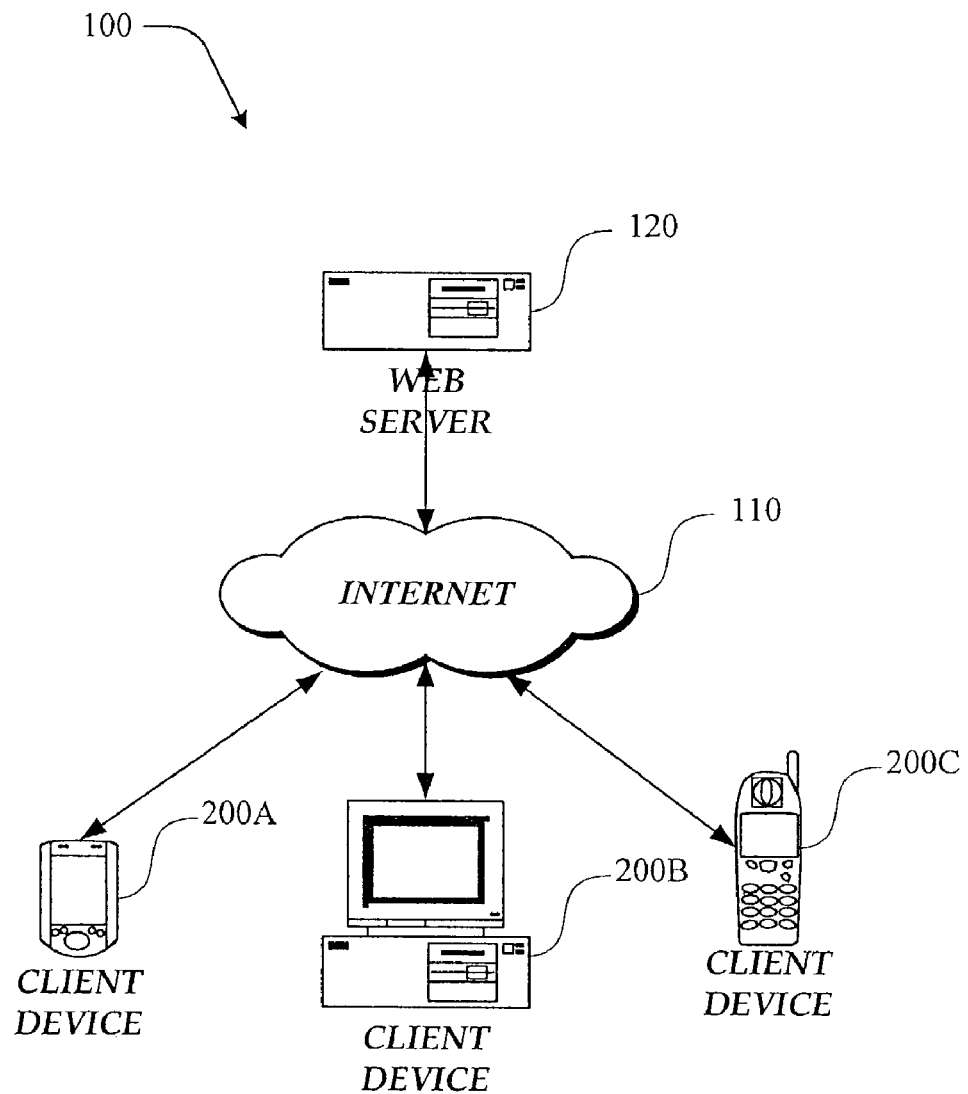
FIG. 1 is a pictorial diagram of an exemplary system for providing paged content, i.e., pages for display to client devices.

As previously explained, the capitalized term "Internet" refers to the collection of networks and routers that communicate with one another. FIG. 1 illustrates a functional block diagram of an exemplary, simplified system 100 for providing paged content, i.e., pages to client devices. The system 100 forms a distributed computing environment that includes a plurality of computing devices interconnected by a network 110 (such as the Internet). The plurality of computing devices shown in FIG. 1 includes three client devices 200A, 200B, 200C and a Web server 120 interconnected via the network 110. Each client device 200A, 200B, 200C has computing capabilities and may be any form of device capable of processing the routines of the present invention. While the client devices are pictorially shown as a personal digital assistant ("PDA") 200A, a personal computer 200B and a telephone 200C, these depictions should be taken as illustrative, not limiting. As will be appreciated by those of ordinary skill in the art, the Web server 120 may reside on any device accessible by the client devices 200A, 200B and 200C shown in FIG. 1. An exemplary client device 200 is shown in further detail in FIG. 2 and described below. Additionally, while only a single Web server 120 and three client devices 200A, 200B, and 200C have been shown in FIG. 1, it will be appreciated that many more client devices 200 and Web servers 120 will likely be included in an actual system practicing the present invention.

Figure 2:
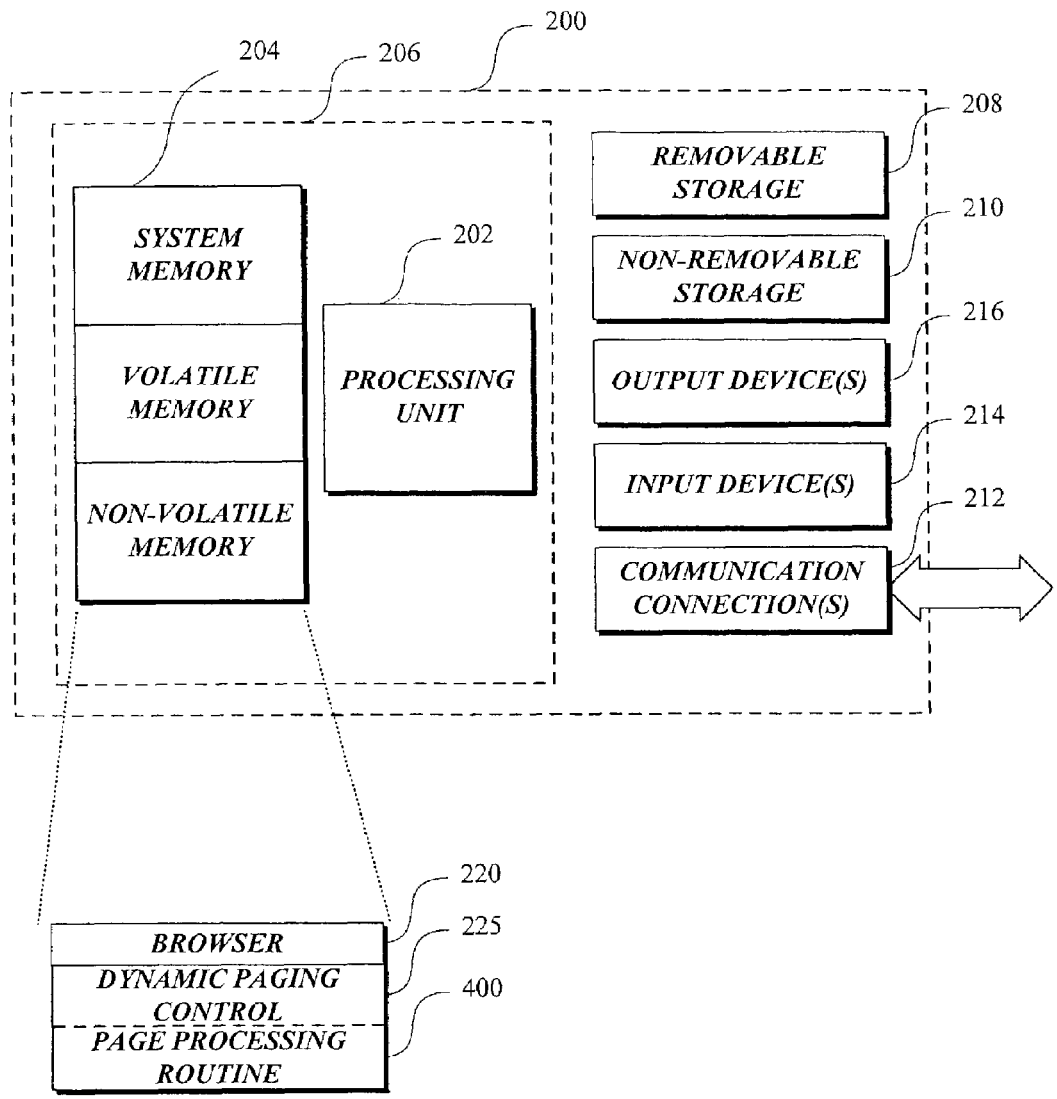
FIG. 2 is a block diagram of a client device, such as a computer, suitable for selecting a type of paging control for display in accordance with the present invention.

FIG. 2 illustrates an exemplary client device 200 for implementing hereinafter described aspects of the present invention. In its most basic form, the client device 200 typically includes at least one processing unit 202 and memory 204. Depending on the exact configuration and type of client device, memory 204 may be volatile (such as RAM), nonvolatile (such as ROM, flash memory, etc.), or some combination of the two. This most basic configuration is illustrated in FIG. 2 by dashed line 206. Client device 200 may also have additional features/functionality. For example, device 200 may also include additional storage (removable and/or non-removable) including, but not limited to, magnetic or optical disks or tape. Such additional storage is illustrated in FIG. 2 by removable storage 208 and nonremovable storage 210. Computer storage media includes volatile and nonvolatile, removable and nonremovable media implemented in any method or technology for storage of information such as computer readable instructions, data structures, program modules, or other data. Memory 204, removable storage 208, and nonremovable storage 210 are all examples of computer storage media. Computer storage media includes, but is not limited to, RAM, ROM, EEPROM, flash memory or other memory technology, CD, DVD or other optical storage, magnetic cassettes, magnetic tape, magnetic disk storage or other magnetic storage devices, or any other medium which can be used to store or read desired information and which can be accessed by the client device 200. Any such computer storage media may be part of client device 200.

Figure 4:
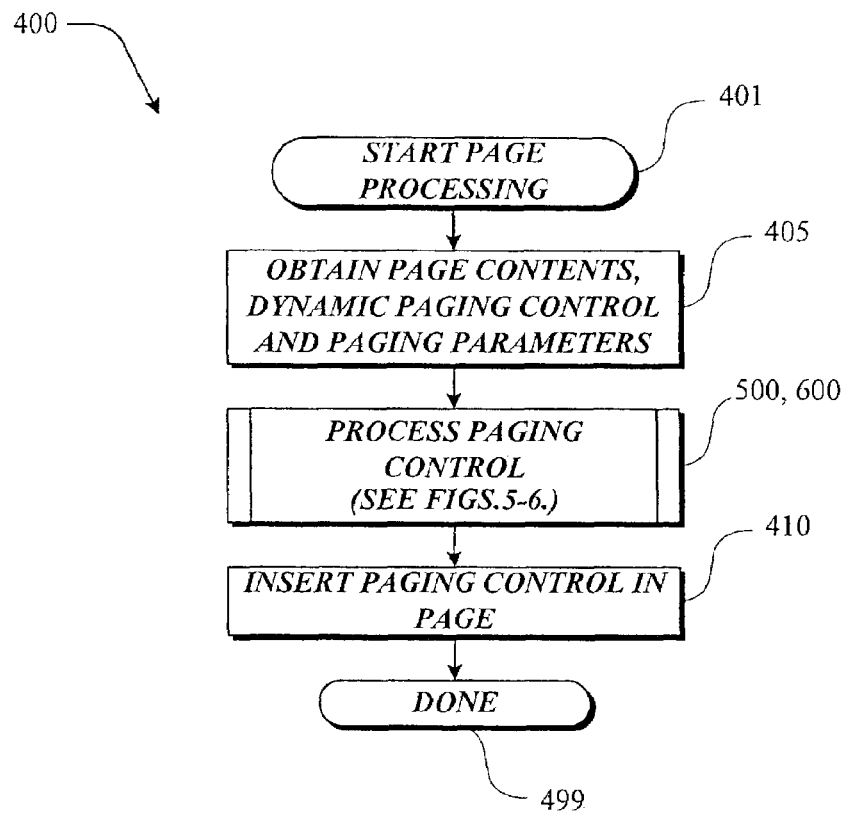
FIG. 4 is an overview flow diagram illustrating a page processing routine according to the present invention.

The memory 204 of a client device 200 practicing the present invention stores a multimedia browser 220 and a dynamic paging control 225 that includes a page processing routine 400. As well known to those skilled in the art, the browser 220 contains computer programs and/or routines, suitable for communicating with and processing information from remote computers (e.g., Web server 120). A page processing routine 400 formed in accordance with this invention is illustrated in FIG. 4 and described below. In addition to the page processing routine, the dynamic paging control includes a plurality of paging controls that, as will be better understood from the following description, are selectable by the page processing routine.

The reusable paging controls included in the dynamic paging control 225 may be formed in a number of different manners, all well known to those skilled in the art. In one exemplary embodiment of the present invention, the dynamic paging control 225 is formed using scripting instructions, such as JScript or Visual Basic Scripting. In an alternate embodiment, an embedded program such as a JAVA applet, is used to form a reusable self-contained and self-configuring dynamic paging control 225 that adapts to paging environments and/or input parameters in a dynamic manner. In a still further embodiment, the dynamic paging control 225 may be formed as an integral part of a computing application that displays paged content, for example, using Win32 APIs and a coding language such as C++, C#, Visual Basic etc.

In still further embodiments of the present invention, the paging controls do not reside on the client device 200. Rather, the paging controls reside on a remote device (e.g., web server 120 or another device) and only HTML (or other markup language) instructions forming a representation of a paging control are sent by the dynamic paging control 225 to the client device 200 for display.

Client device 200 also contains a communications connection 212 that allows the device to communicate with other devices. The communication connection 212 is used to communicate computer-readable instructions, data structures, program modules, or other data using a modulated data signal modulated by the data to be communicated. By way of example and not limitation, communication connection includes wired connections, both copper and optical, and wireless connections such as acoustic, radio frequency, infrared, etc.

Client device 200 may also have input device(s) 214 such as a keyboard, a mouse, a pen, a voice input device, a touch input device, etc. Output device(s) 216 such as a display, speakers, a printer, etc. may also be included. Since all these devices are well known in the art, they are not described here.

Figure 3:
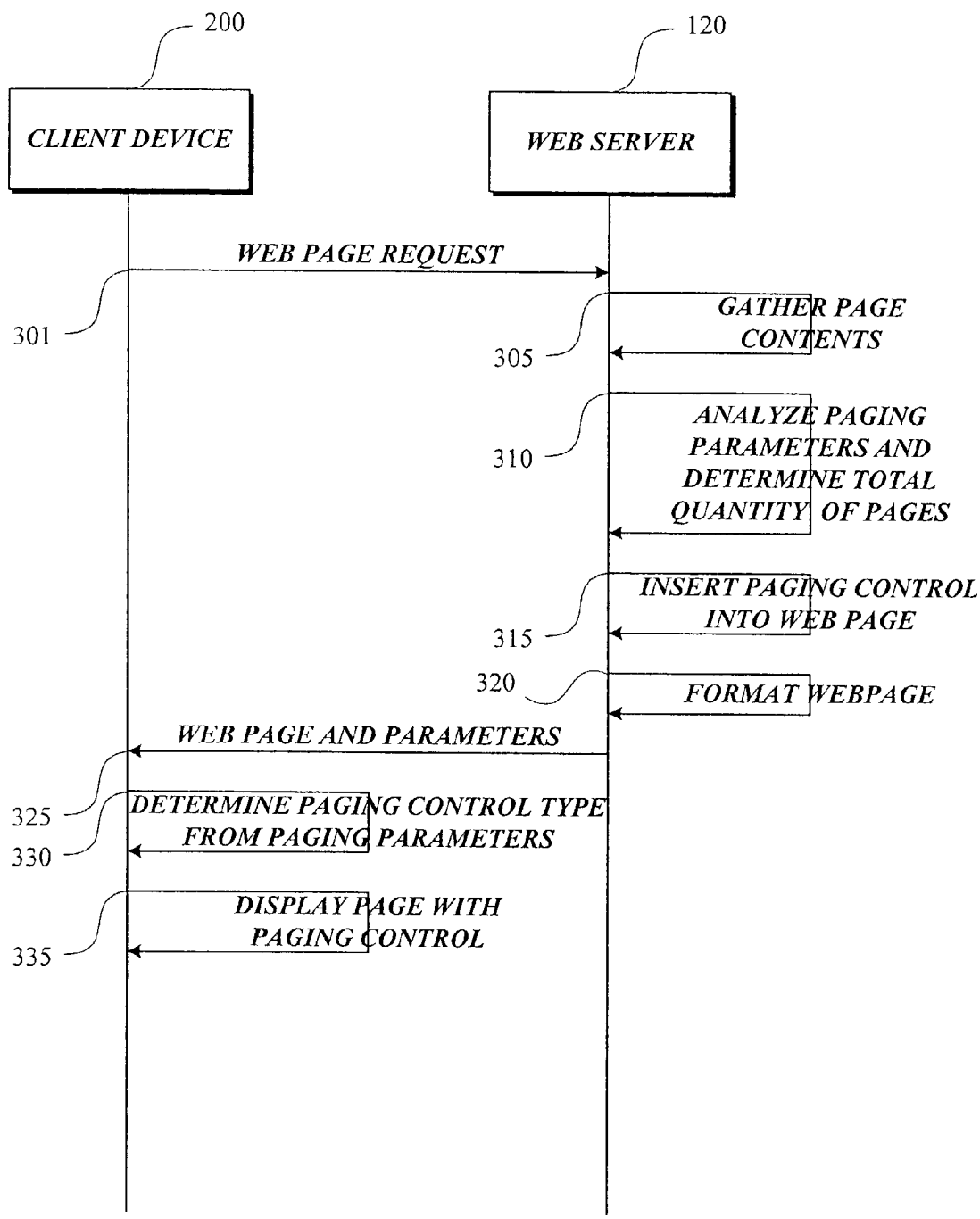
FIG. 3 is a diagram illustrating the actions of a client device and a Web server when selecting a paging control type for display in accordance with the present invention.

The operation of a dynamic paging control will be better understood by reference to FIG. 3, which illustrates one exemplary sequence of the interactions between devices including a communications system 100 shown in FIG. 1 employing this invention. The devices of system 100 illustrated in FIG. 3 include a single client device 200 and the Web server 120.

In the example shown in FIG. 3, the client device 200 sends a request for a Web page 301 to the Web server 120. The Web server 120 gathers 305 Web page contents including parameters describing the number of pages available for display and the number of the page requested by the client device. Next, the paging parameters are analyzed 310 to determine the total number of pages. The dynamic paging control 225 is then inserted 315 into the Web page. The Web page is then formatted 320 as needed for delivery to the client device 200. At the client device 200, the dynamic paging control 225 determines the paging control type to be displayed based on the Web page parameters 330, specifically, the number of pages to be displayed, and the nature of the client device. Next, the Web page with the determined paging control type is displayed 335.

Those of ordinary skill in the art and others will appreciate that FIG. 3 represents only one exemplary set of interactions between devices of system 100. For example, the analysis of the paging parameters and the determination of the number of pages could occur at the client device 200 rather than at the Web server 120. Additionally, execution of the dynamic paging control 225 to determine which paging control type to use could occur at the Web server 120 instead of at the client device 200.

Figure 5:
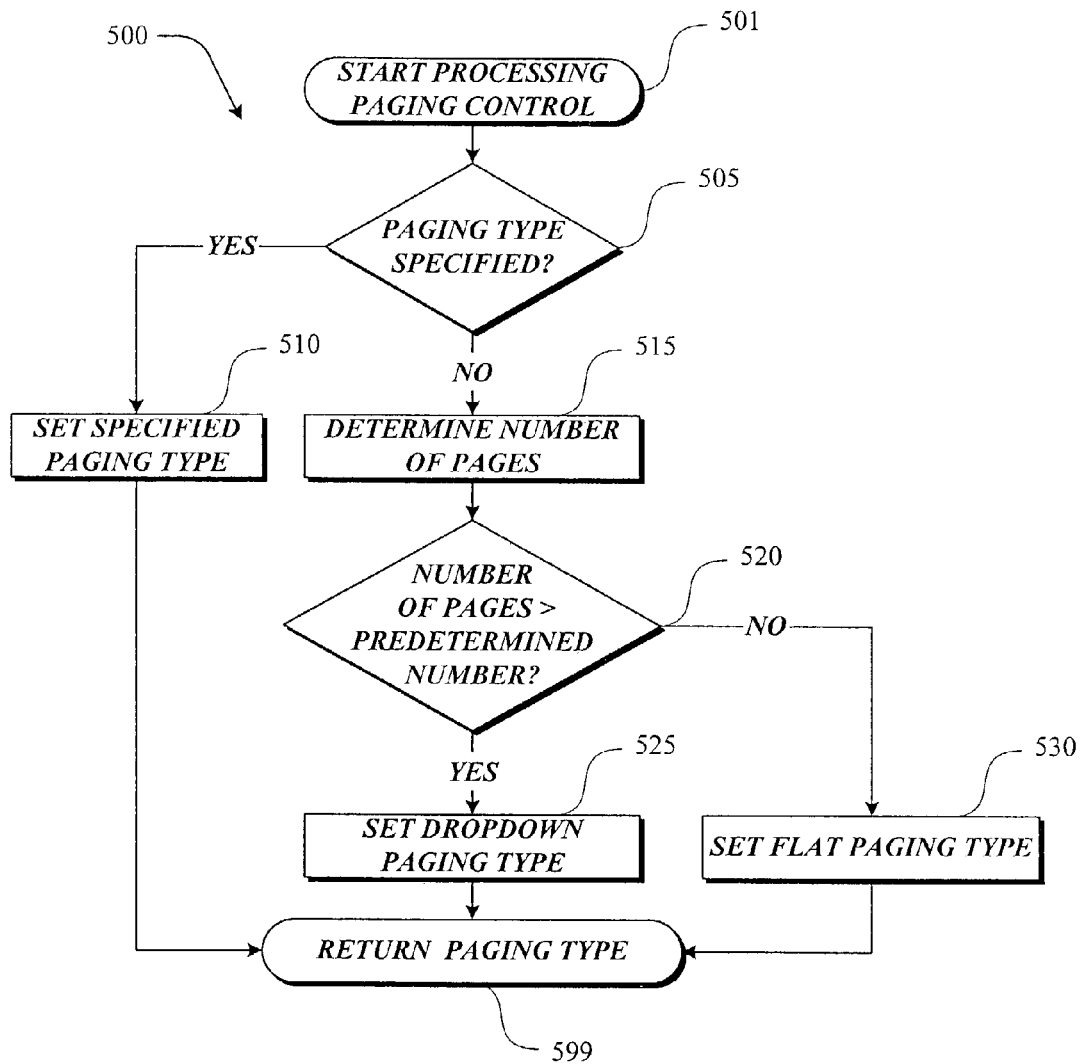
FIGS. 5 and 6 are overview flow diagrams illustrating paging control processing subroutines suitable for use in FIG. 4.
Figure 6:
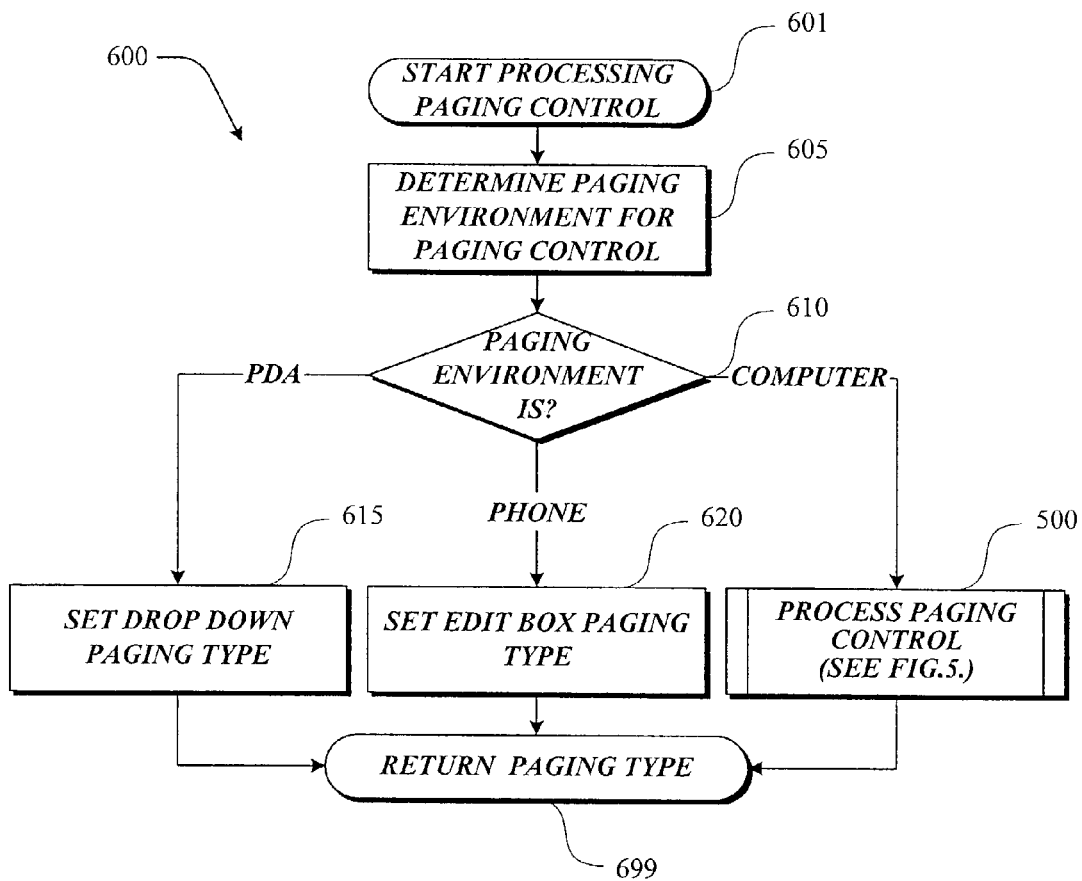

Further, as will be better understood from the following description of FIGS. 4-6, information other than the number of pages available for display can be used to determine the type of paging control to be used, i.e., displayed. For example, the page contents may include a parameter or parameters that dictate a particular type of page control, or the type of client device may dictate that a particular type of page control be used.

A flow chart illustrating an exemplary page processing routine 400 suitable for processing a page to be displayed at a client device 200 is shown in FIG. 4. The page processing routine 400 begins at block 401 and proceeds to block 405 where page contents, a dynamic paging control, and paging parameters, are obtained. Processing then proceeds to paging control processing subroutine block 500 or 600 illustrated in FIG. 5 or 6 and described below. Both subroutines 500 and 600 process paging parameters to determine the type of paging control to display (use) at the client device 200. Those of ordinary skill in the art and others will appreciate that paging control subroutines 500 and 600 are merely exemplary paging control subroutines using a limited number of parameters and that other paging control subroutines using more or fewer parameters may be used without departing from the spirit and the scope of the present invention. Once the paging control processing subroutine 500 or 600 returns with a paging control type, the paging control type is inserted into the page in block 410 for eventual display at the client computer 200. The page processing routine 400 then ends at block 499.

As noted above, the page processing routine 400 may be operative either at the client device 200 or at a remote computer, such as the Web server 120. Thus the type of paging control 225 may be chosen either at a client device or a server without departing from the spirit and scope of the present invention. Additionally, it will also be appreciated that while paged content may include a list of Web pages resulting from a Web search; this should be construed as exemplary and not limiting. Content other than lists of Web pages also falls within the scope of the present invention. For example, the invention can be used with a word processing program, or with programs that download both large and small documents. Also, the invention can be used with networks other than the Internet, an intranet, for example.

In an alternate embodiment of the present invention, the page processing routing 400 is further operative to call and alternate paging control processing subroutine (not shown) similar to paging control processing subroutine 600 (described below) if the paging environment changes. For example, if the resolution on a display device is changed (e.g., when a portable computer is "unlocked" from a larger display) or the window of a computing application displaying the dynamic paging control is resized. The alternate paging control processing would then determine a paging control type based on the newly changed paging environment.

FIG. 5 illustrates an exemplary paging control processing subroutine 500 suitable for use in FIG. 4. The exemplary paging control processing subroutine 500 begins at block 501 and proceeds to decision block 505 where a determination is made whether a type of paging control has been specified in the paging parameters of the requested page. If so, processing continues to block 510 where the specified type of paging control is used. Subroutine 500 then returns the specified paging control type at block 599 to its calling routine. Otherwise, if in decision block 505 it was determined that no type of paging control was specified in the requested page then, in block 515 the number of pages available for display is determined. Depending on the use of this invention, this may be the number of pages listing the results of a Web search, the number of pages of a document including the requested pages, etc. Those of ordinary skill in the art and others will appreciate that determining the number of pages available for display may be specified in a number of ways. The paging parameters may explicitly recite the total number of pages and the number of the current page. Or, the contents of each page may be made up of a predetermined number of components. In this case, the paging parameters may recite the predetermined number of components to be included on a page and the total number of components. From this information, the total number of pages available for display can be determined by dividing the total number of components by the predetermined number of page components to be included on a page rounded up to the nearest integer. Still further, the number of page components to be included on each page may depend on the nature of the client device 200. In this case, determining the total number of pages requires analyzing each page component and determining how many page components will fit on each page, and totaling the number of pages. The foregoing methods should be taken as illustrative and not limiting. The described methods are not an exhaustive list of the methods that can be used to determine the total number of pages available for display. Those of ordinary skill in the art and others will be able to readily envision other methods of determining the total number of pages available for display.

After the number of pages available for display has been determined in block 515, processing continues to decision block 520 where a determination is made whether the number of pages is greater than a predetermined amount. In one exemplary embodiment of the present invention, the predetermined amount of pages is ten pages; however, those of ordinary skill in the art and others will appreciate that any predetermined amount of pages may be set as a threshold in decision block 520. Accordingly, if, in decision block 520, a determination is made that the number of pages is greater than a predetermined amount, processing continues to block 525 where a first type of paging control is set, i.e., chosen. In the illustrated embodiment, the paging control is a drop-down paging control 730. Processing then continues to block 599 where the selected paging control type (i.e.; the drop-down paging control) is returned to the calling routine.

If, however, in decision block 520, a determination is made that the number of pages is not greater than the predetermined amount, processing continues to block 530 where a second type of paging control is set, i.e., chosen. In the illustrated embodiment of this invention, the paging control is a flat paging control 710. After which, processing continues to block 599 where the selected paging control type (i.e., flat paging control) is returned to the calling routine.

Exemplary paging control processing subroutine 500 automatically determines a paging control type based on either a specified type or the number of pages available for display. FIG. 6 illustrates an alternate processing paging control subroutine 600 that includes a further determination based on the of the paging environment (e.g., the type of client device or the size of the display of the client device). The characteristics of the paging environment are included in the paging parameters sent to the server device if the server device selects the type of paging control to be used (or provided in some other way to the server). On a client device 200, the parameters that specify the paging environment may be passed to the client device 200, or may be gathered at the client device (e.g., by using environment variables).

The alternative paging processing control subroutine 600 begins at block 601 and proceeds to block 605 where the characteristics of the paging environment of the client device is determined. As noted above, this determination may be made by either analyzing passed paging parameters if the selection is made by the server or by other means if the selection is made at the client device. Next, in decision block 610, a determination is made about the nature of the paging environment. If, for example, in decision block 610, it is determined that the paging environment is aPDA, then, in block 615, a drop-down paging control type is set. The drop-down paging control type is then returned in block 699 to the calling routine. If, however in decision block 610, it is determined that the paging environment is a telephone (e.g., a cellular phone), processing continues to block 620 where an edit box paging control type is set. Processing then continues to block 699 where the edit box paging control type is returned to the calling routine. If, in decision block 610, it is determined that the paging environment is a computer, processing makes a pass through a subroutine block 500 similar to the subroutine 500 illustrated in FIG. 5 and described above. The type of paging control returned by subroutine 500 is returned to the calling routine in block 699.

Figure 7A:
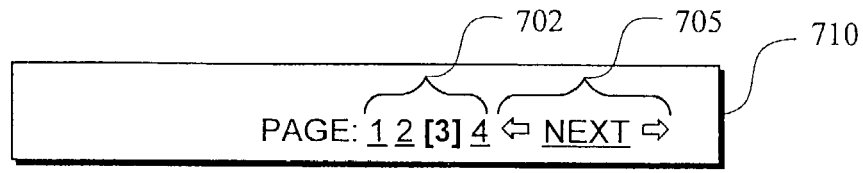
FIGS. 7A-E are exemplary paging control displays in accordance with exemplary embodiments of the present invention.

FIGS. 7A-7E illustrate exemplary types of paging controls. FIG. 7A illustrates a flat paging control 710 wherein all pages are included in a series of page numbers 702 with the current page highlighted (e.g., in bold with brackets). Also included are "back" and "next" arrows and a "NEXT" link 705.

Figure 7B:
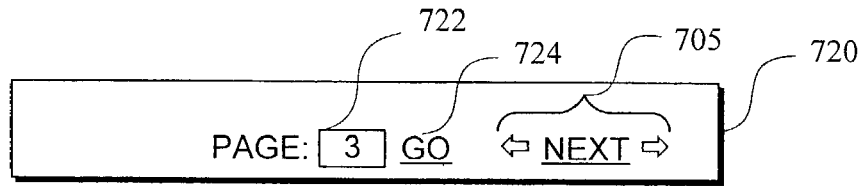

FIG. 7B illustrates an exemplary edit box paging control wherein a page number is entered into an edit box 722 using a keyboard. When a "go" button 724 is activated the display button switches to the page whose number is in the edit box 722. Also included are "back" and "next" arrows and a "NEXT" link 705.

Figure 7C:
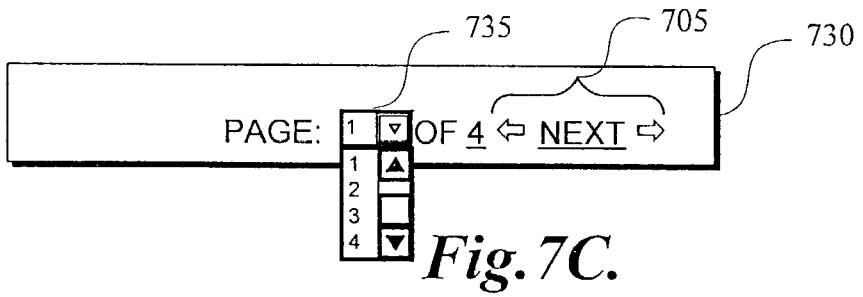

FIG. 7C illustrates yet another type of paging control, namely a "drop-down" or "combo box" paging control 730 wherein a page number may be entered into a combo box 735 or may be selected from a list that drops down from the combo box. Also included are "back" and "next" arrows and a "NEXT" link 705.

Figure 7D:
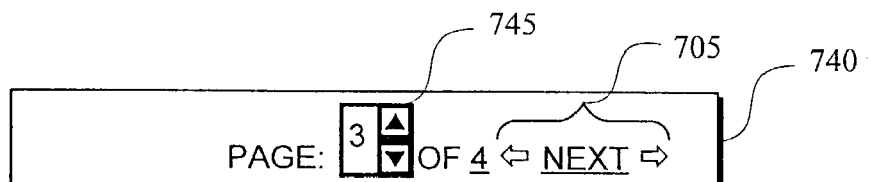

FIG. 7D illustrates still another type of paging control, namely a spin paging control. A spin paging control includes a spin control 745 wherein pages are iterated through using directional arrows that sequentially move through all available pages. Also included are "back" and "next" arrows and a "NEXT" link 705.

Figure 7E:
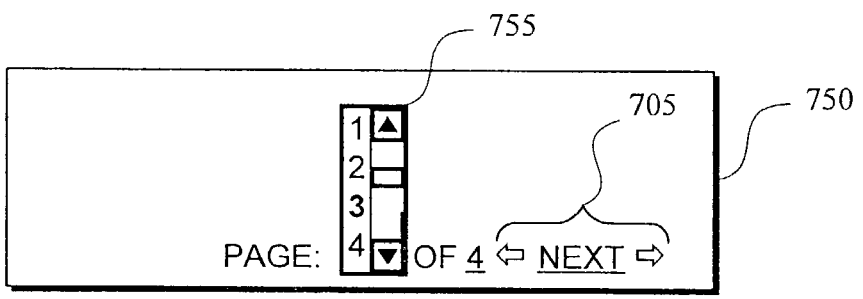

FIG. 7E illustrates yet another type of paging control, namely a list box paging control 750. The illustrated list box paging control 750 includes a scrollable list 755 of available pages. Also included are "back" and "next" arrows and a "NEXT" link 705.

Those skilled in the art will appreciate that FIGS. 7A-7E do not comprise an exhaustive showing of types of paging controls. Many other types of paging controls are well known to those of ordinary skill in the art and others. As will be appreciated by those skilled in the art, different types of paging controls may share specific elements such as next and back buttons as images and/or text for navigating forward and/or backwards through the page numbers.

Those skilled in the art will further appreciate that the "back" and "next" buttons 705 are optional. However, if the "back" and "next" buttons are included, they may be disabled at the first and last pages, respectively, of the pages available for display.

It will also be appreciated by those of ordinary skill in the art and others that further variations on each of the above-listed types of paging controls fall within the scope of the present invention. For example, if a flat paging control type is chosen and only a limited amount of space is available, only some of the pages available to the flat paging control may be displayed. For example, if page twelve out of 110 available pages is being displayed and only room for a maximum list of fourteen pages is available, the flat paging control might display "1 5 10 11 [12] 13 14 15 20 30 40 50 100 110".

While exemplary embodiments of the invention have been illustrated and described, it will be appreciated that various changes can be made therein without departing from the spirit and scope of the invention as defined by the appended claims.

The embodiments of the invention in which an exclusive property or privilege is claimed are defined as follows:

1. A computer implemented method for dynamically presenting a control for controlling the display of a plurality of pages on a display device, the method comprising:

automatically obtaining, without user input, paging parameters that include the maximum number of pages to be displayed and page contents;

if a paging control type has not been specified in said paging parameters, automatically and without user input selecting a paging control type from a plurality of paging control types, the paging control type comprising a paging parameter suitable for controlling page displays based on the maximum number of pages to be displayed, the paging control type being selected from a plurality of paging control types including a spin control type, the spin control type rendering a directional arrow and numbers of pages to be displayed on the display device, the plurality of pages being sequentially displayed on the display device by moving the directional arrow through the numbers of pages; and displaying said page contents and a paging control defined by said paging control type based on the position of the directional arrow.

2. The method of claim 1, wherein selecting said paging control type from a plurality of paging control types includes determining if the maximum number of pages to be displayed exceeds a predetermined threshold.

3. The method of claim 1, wherein said paging control and said page contents are displayed on the display device, the display dimensions of the display device being included in the paging parameters.

4. The method of claim 3, wherein selecting said paging control type includes determining if said display dimensions of said display device are within a predetermined range.

5. The method of claim 1, wherein selecting said paging control type includes:
   determining if said paging parameters specify the display device for displaying said page contents and said paging control; and
   if said paging parameters specify the display device for displaying said page contents and said paging control, selecting a paging control type suitable for said display device.

6. The method of claim 1, wherein selecting said paging control type from said plurality of paging control types is performed by a device suitable for displaying said page contents.

7. The method of claim 1, wherein selecting said paging control type from said plurality of paging control types is performed by a device remote from a device suitable for displaying said page contents.

8. The method of claim 1, wherein said paging control type is selected from a plurality of paging control types further comprising a flat control type, an edit box control type, a drop-down control type, and a list box control type.

9. The method of claim 1 further comprising:
   determining if said paging parameters have changed; and
   if said paging parameters have changed, repeating the selection of said paging control type based on said changed paging parameters.

10. A computer readable storage media containing computer executable instructions for performing the method as in any one of claims 1 and 2-9.

11. A computer system having a processor, a memory, and a storage medium storing computer executable instructions operative to perform the method as in any one of claims 1 and 2-9.

12. A computer implemented method for dynamically presenting a control for controlling the display of a plurality of pages on a display device, the method comprising:

automatically obtaining, without user input, page contents and paging parameters that include the display dimensions of the display device suitable for displaying said page contents;

if a paging control type has not been specified in said paging parameters, automatically and without user input selecting a paging control type from a plurality of paging control types, the paging control type comprising a paging parameter suitable for controlling page displays based on said display dimensions, the paging control type being selected from a plurality of paging control types including a spin control type, the spin control type rendering a directional arrow and numbers of pages to be displayed on the on the display device, the plurality of pages being sequentially displayed on the display device by moving the directional arrow through the numbers of pages; and displaying said page contents and a paging control defined by said paging control type based on the position of the directional arrow.

13. The method of claim 12, wherein selecting said paging control type includes determining if said display dimensions of said display device are within a predetermined range.

14. The method of claim 12, wherein selecting said paging control type includes:
   determining if said paging parameters specify the display device for displaying said page contents and said paging control; and
   if said paging parameters specify the display device for displaying said page contents and said paging control, selecting a paging control type suitable for said display device.

15. The method of claim 12, wherein selecting said paging control type from said plurality of paging control types is performed by a device suitable for displaying said page contents.

16. The method of claim 12, wherein selecting said paging control type from said plurality of paging control types is performed by a device remote from a device suitable for displaying said page contents.

17. The method of claim 12, wherein said paging control type is selected from a plurality of paging control types further comprising a flat control type, an edit box control type, a drop-down control type, and a list box control type.

18. The method of claim 12 further comprising:
   determining if said paging parameters have changed; and
   if said paging parameters have changed, repeating the selection of said paging control type based on said changed paging parameters.

19. The method as in claim 1 or 12, wherein each paging control type includes a "back" button operable for each page to be displayed except the first page to be displayed, and a "next" button operable for each page to be displayed except the last page to be displayed.

* * * * *